United States Patent [19]
Paulson

[11] Patent Number: 5,167,994
[45] Date of Patent: Dec. 1, 1992

[54] REUSABLE CORE FOR PAPER ROLLS

[75] Inventor: Morris G. Paulson, Bloomington, Minn.

[73] Assignee: Boise Cascade Corporation, Boise, Id.

[21] Appl. No.: 688,741

[22] Filed: Apr. 19, 1991

[51] Int. Cl.⁵ .............................................. F16L 9/16
[52] U.S. Cl. .................................. 428/34.2; 428/36.7;
428/36.91; 428/192; 428/485; 428/486;
428/490; 428/491; 428/507; 428/511; 428/906;
138/144
[58] Field of Search ..................... 428/34.2, 34.3, 36.9,
428/36.91, 37, 535, 537.5, 511, 491, 486, 507,
490, 192, 485, 99, 906, 36.7; 138/144;
424/423.4, 653; 524/408, 430, 434, 545

[56] References Cited

U.S. PATENT DOCUMENTS

| | | | |
|---|---|---|---|
| 2,755,821 | 7/1956 | Stahl | 138/144 |
| 3,451,433 | 6/1969 | Cunningham | 138/144 |
| 3,548,883 | 12/1970 | Cohen | 138/144 |
| 3,587,656 | 6/1971 | Cunningham | 138/144 |
| 3,783,908 | 1/1974 | Stump | 138/144 |
| 3,980,107 | 9/1976 | Barnes | 138/144 |
| 4,965,105 | 10/1990 | Ruggeberg | 428/34.2 |

FOREIGN PATENT DOCUMENTS 253960 8/1964 Australia .
0167259 10/1982 Japan .

Primary Examiner—Ellis P. Robinson
Assistant Examiner—Rena Dye
Attorney, Agent, or Firm—Klarquist, Sparkman, Campbell, Leigh & Whinston

[57] ABSTRACT

A multiple ply tubular core having continuous vapor barrier layers near the inner and outer surfaces of the tube. The vapor barrier layers have overlying and underlying layers comprising fibrous cellulosic material. The tube is stable to dimensional changes caused by absorption or loss of moisture to the atmosphere.

12 Claims, 1 Drawing Sheet

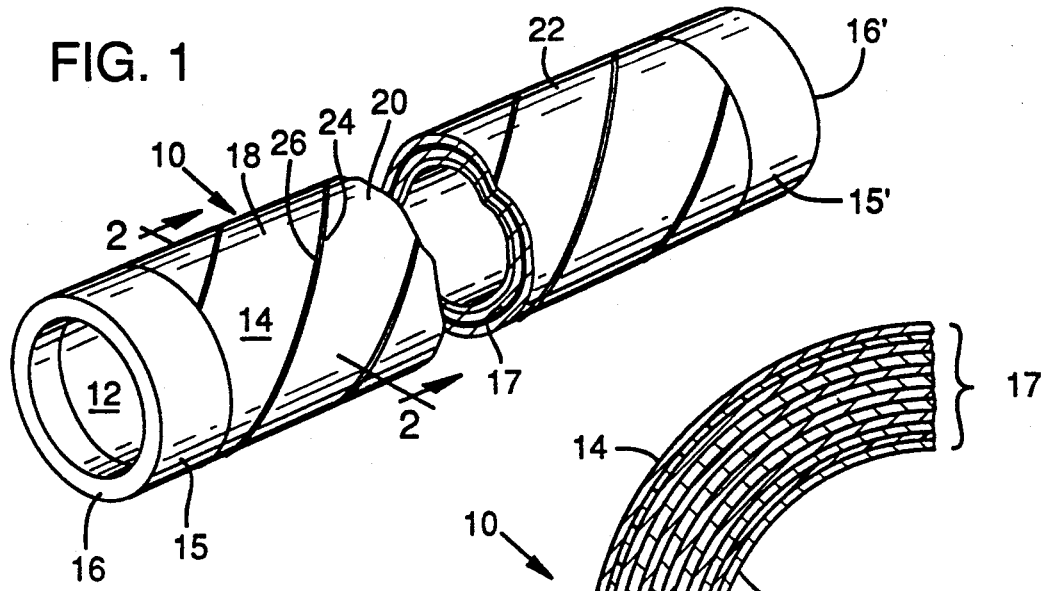

REUSABLE CORE FOR PAPER ROLLS

TECHNICAL FIELD

This invention relates to tubular spools or cores for supporting rolls of paper during their production, transportation, storage, and reprocessing.

BACKGROUND OF THE INVENTION

In the commercial production of paper the raw paper is typically wound on a tubular core. Most cores used for winding raw paper are made entirely of steel or entirely of multi-layer laminated paper. Although steel cores are reusable, they are heavy and difficult to handle. They are also expensive. Paper cores, on the other hand, have considerable advantages in that they are light, easy to use, relatively inexpensive compared to steel cores, and may be recycled. However, they tend to be dimensionally unstable and therefore not reusable with any degree of reliability or predictability.

Paper cores are generally manufactured according to a well known process wherein a number of strips of fibrous material, typically Kraft paper of various grades, are spirally wound on a rotating mandrel in overlying relationship to one another. Multiple plies of the paper are wound over one another to increase the thickness of the wall of the core. The thickness of the wall of the core will depend upon the particular end use for the core; where a stronger core is required the wall thickness is increased accordingly. An adhesive is generally applied between the plies as they are spirally wound to increase the strength of the resulting tube. Spiral winding is a continuous process; the tube is cut to the desired length as it is formed.

Paper cores may also be formed in a batch type operation wherein a single, wide sheet of fibrous material such as Kraft paper is wound onto a rotating mandrel until the desired number of plies and thickness have been achieved. This process is slower than the spiral winding process since only one tube may be formed at a time, and is therefore used much less often.

Whether a core for holding raw paper is manufactured by spiral winding or by single sheet winding, end caps known as tips are often attached to each end of the core to facilitate attachment of the core to the paper winding and processing machinery. The tips also protect the ends of the core from mechanical damage.

Unlike metal cores for paper rolls, which may be used repeatedly, most paper cores are limited in the number of times that they may be used. Often they may be used only once because of their dimensional instability. As ambient humidity changes, the paper in the core tends to absorb moisture from, or lose moisture to the atmosphere. This causes dimensional changes to occur, often resulting in the core exceeding the allowed tolerances in dimensional specifications. When the dimensional tolerances are exceeded the core must be discarded or recycled since it can no longer be used on the paper machines.

Because prior paper cores for supporting rolls of raw paper are known to be vulnerable to dimensional changes with changes in ambient humidity, each core must be carefully inspected and measured before it can be reused. Such inspection is labor intensive and time consuming, and therefore expensive. As a result, paper cores are often simply discarded after a single use. Thus, a need exists for a reusable core for supporting paper rolls that has all of the advantages of a core made entirely of paper and yet is dimensionally stable so that it can be reused. This is the primary objective of the present invention.

Core tubes made of composite materials, including paper, for purposes other than supporting rolls of paper, are known. Such tubes may or may not be dimensionally stable, depending on their construction and the environments in which they are used. In any case, in the applications for such composite tubes, dimensional stability is apparently not of concern. Accordingly, such prior composite core tubes do not suggest an acceptable solution to the problem of providing a dimensionally stable and therefore reusable core tube made in a largely conventional manner primarily of paper and suitable for supporting rolls of paper. For example, in U.S. Pat. No. 2,755,821 to Stahl, a spirally wound tube for use as a core in electrical applications is disclosed. In that patent a tube is provided having an inner strip of insulating paper overlaid by a central layer of a dielectric material such as thermo-setting polyester film. The dielectric layer is overlaid by an outer insulating layer, typically paper. This tube is useful for electrical applications such as a base for coil and transformer windings. U.S. Pat. No. 3,451,433 to Cunningham discloses a spirally wound core tube having a combination of multiple plies of resin impregnated textile material and at least one ply of paper bonded to the textile plies. This core is used as a forming tube for spun glass filaments. Similarly, U.S. Pat. No. 3,587,656, to Cunningham is directed to a multi-layer, spirally wound tube for use as a forming tube for spun glass fibers, in which all the layers are of paper, but in which the outer and end surfaces are impregnated with a synthetic resin. This results in a tube with a hard outer layer and end surface of resin impregnated paper. The resin increases the strength and moisture resistance of the outer and end surfaces of the tube, yet provides a smooth peripheral surface upon which the fibers are spun.

SUMMARY OF THE INVENTION

The present invention is a dimensionally stable and therefore reusable tubular core composed primarily of paper for supporting rolls of paper. It is made primarily of spirally or concentrically wound strips of paper or other cellulosic fibrous sheet material using largely conventional manufacturing method and apparatus. Therefore it has the advantages of light weight, easy handling, and low cost as compared to reusable steel cores. A water vapor barrier is embedded between the outermost layer or layers and central or intermediate layers of fibrous material. Similarly, a water vapor barrier is embedded between the innermost layer or layers of fibrous material and the central or intermediate layers. The vapor barrier layers prevent the fibrous materials used in constructing primarily intermediate layers of the tube from absorbing moisture from the atmosphere. This minimizes changes in the dimensions of the tube with changes in ambient humidity. Dimensional changes caused by absorption of atmospheric moisture are essentially eliminated, and the core is therefore reusable.

Various grades of Kraft paper may be used for the inner, center, and outer layers, depending upon the specific use for the tube and cost requirements. The vapor barrier layers may also be made of various materials. The primary criteria is that the vapor barrier layers be substantially impervious to moisture to prevent absorption of atmospheric moisture by paper in the center layer of the core.

BRIEF DESCRIPTION OF THE DRAWINGS

FIG. 1 is a perspective view of a tubular paper roll core made in accordance with the present invention.

FIG. 2 is a transverse sectional view taken along the line 2—2 of FIG. 1.

FIG. 3 is a transverse sectional view similar to FIG. 2, but showing a second embodiment of the present invention.

FIG. 4 is a perspective view of a tubular paper roll core supporting a finished roll of paper.

FIG. 5 is a perspective view of a composite material used in manufacturing one embodiment of the tube of the present invention.

DETAILED DESCRIPTION OF A PREFERRED EMBODIMENT

A preferred embodiment of paper core tube 10 for supporting rolls of paper 11, and manufactured in accordance with the present invention is depicted generally in FIG. 1. The tube 10 has a cylindrical inner surface 12, a cylindrical outer surface 14, and two laterally spaced apart opposite ends 16 and 16'. The ends 16 and 16' are fitted with end caps 15 and 15', though end caps 15 and 15' are optional and are not used with all types of cores. The end caps are used when called for by the specific end use of the core; they serve mainly to protect the end of the tube from mechanical damage caused by wear and tear from the machinery. Tube 10 also has a laminated side wall 17. As will be discussed more fully below, laminated side wall 17 is constructed of a plurality of separate layers.

Although tube 10 is depicted herein as being substantially circular in transverse cross-section, tubes may also be manufactured with other transverse cross-sectional shapes, such as square tubes.

Tubes made in accordance with the present invention may be of variable diameters and wall thicknesses, depending upon the type of paper that is being wound on the core. For example, a typical size core for holding liner board, newsprint, or paper for the ground wood specialty business would have an inside diameter of 7.64 cm. (3.01 inches), and an outside diameter of 10.79 cm. (4.25 inches). The thickness of laminated side wall 17 with this core would be 3.15 cm. (1.24 inches). The length of the tube will also vary with the type of paper being wound on the core. Cores range in length from as little as 22.86 cm. (9.00 inches) to 152.40 cm. (60.00 inches) or more. As noted, the inside diameter of the tube will vary depending upon the type of paper which is wound on the core and upon the particular purpose for which the core will be used. The inside diameter of cores typically ranges from 1.27 cm. (0.50 inches) for adding machine paper rolls, up to 20.32 cm. (8.00 inches) for some converting operations.

The core serves many purposes in the paper making operation. First, it acts as a support upon which the raw paper is rolled. The core also facilitates transportation of the roll of paper. For example, a forklift fitted with a prong can lift the rolls of paper by inserting the prong into the core. Further, the roll of paper may be used on converting machinery where the raw paper is further processed into other items, such as envelopes. In this sense the core facilitates attachment of the roll of paper to the appropriate machinery.

The dimensional length of the cores is extremely important with respect to the proper functioning of machinery with which the cores are used. A tolerance of ±0.159 cm. (0.063 inches) in the length of the core must typically be maintained. If the length of the core exceeds this tolerance it must be discarded since use of the core will cause problems on the paper machines. Moreover, since in many paper making operations numerous cores are fitted onto one paper making machine the problems caused by out-of-specification cores would be multiplied. Accordingly, the length of the core is extremely important.

As can be seen in FIG. 1, tube 10 is manufactured according to the well-known process of spirally winding a plurality of strips over one another. Any number of strips may be wound upon one another, and increasing the number of strips increases the thickness of laminated side wall 17. For convenience, each strip may be referred to as a single ply. Each strip may be wound such that the lateral edge of one strip abuts the opposite lateral edge of the same strip as the mandrel is rotated. For example, in FIG. 1 lateral edge 24 of strip 20 abuts lateral edge 26 of strip 18. In many cases there will be a small gap between the abutting lateral edges. However, subsequent windings of strips may be offset from the underlying strip so that the abutting edges of one strip are not aligned with the abutting edges of the underlying strip, thereby strengthening the core and preventing penetration of moisture into the core.

A single strip forms one distinct ply. Thus, as the mandrel is rotated a single strip is continually wrapped around the mandrel, with the lateral edge of one wrapping abutting the lateral edge of the previous wrapping of the same strip. In FIG. 1 the numerals 18, 20, and 22 represent multiple wrappings of a single strip of the material used to manufacture the core. A detailed drawing of the preferred embodiment of the present invention is shown in FIG. 2. Laminated side wall 17 of tube 10 consists of five distinct layers: inner layer 30; first vapor barrier layer 32; center layer 34; second vapor barrier 36; and, outer layer 38. The thickness of each of these layers is variable, and is determined by the number of strips that are wound upon one another to form that layer. For example, in FIG. 3, which is a second embodiment of the present invention, inner layer 40 is formed by spirally wrapping two strips or plies of material upon one another. Center layer 44 is depicted as consisting of multiple plies, and is therefore thicker than inner layer 40.

Returning to FIG. 2, inner layer 30, center layer 34, and outer layer 38 are typically made of a fibrous cellulosic material such as Kraft paper (FIG. 2). The grade of the Kraft paper used in each of these layers may vary, depending upon the type of paper that will be wound upon the finished core, and on cost requirements. For example, low yield virgin Kraft fiber (40% yield) or high yield virgin fiber (greater than 50% yield) may be used for each of these layers. Additionally, Kraft paper manufactured of recycled fiber of varying yields may also be used when a relatively low cost core is required. The grade of Kraft fiber used in any of the layers is generally dependent upon the speed of the processing equipment that the core will be used with, and also the type of paper that is rolled onto the core. With newsprint, which requires a relatively strong core, and which is run on high speed equipment, high yield Kraft would generally be used.

The tubular core of the present invention is stabilized with respect to dimensional changes caused by changes in ambient humidity and resulting absorption or loss of atmospheric moisture by incorporation of a first vapor barrier layer 32 and second vapor barrier 36. First vapor barrier 32 overlays inner layer 30, and is sandwiched between inner layer 30 and center layer 34. Second vapor barrier 36 overlays center layer 34, and is sandwiched between outer layer 38 and center layer 34. As with each of the other layers, first and second vapor barrier layers 32 and 36 may be made with multiple strips of vapor barrier material. It is preferred that each strip of vapor barrier material be wound such that one lateral edge of the strip abuts the opposite lateral edge of the same strip. In this way a continuous vapor barrier is formed along the entire length of the tube near the inner surface 12 and outer surface 14.

As noted, center layer 34 comprises a multiple number of strips of fibrous cellulosic material such as Kraft paper, each strip representing a single sheet of paper that is wound on the mandrel. Center layer 34 is thicker than either inner layer 30 or outer layer 38. It is also thicker than either of the vapor barrier layers 32 and 36. Center layer 34 contributes most of the structural strength to tube 10. Accordingly, the thickness of center layer 34 will be either increased by adding more strips or decreased by reducing the number of strips to vary the thickness of laminated side wall 17. Thus, when a thicker laminated side wall 17 is desired, that is, one with an increased number of plies, the number of strips used to make center layer 34 is increased. Increasing the thickness of laminated side wall 17 increases the strength of tube 10.

A suitable adhesive is typically applied between the strips as they are wound on the mandrel. The adhesive is applied in a conventional manner well known in the art.

In the preferred embodiment a composite vapor barrier roll wrapping material is used to supply both first vapor barrier 32 and second vapor barrier 36 (FIG. 2). This material is commercially available from Canadian Pacific Forest Products, Montreal, Quebec, and is sold under the trade name 660 Poly PP8519. It is depicted generally by the numeral 58 in FIG. 5. The vapor barrier roll wrapping 58 consists of a first sheet 60 of fibrous cellulosic material such as Kraft paper, a second sheet 64 of similar fibrous material, and a central vapor barrier sheet 62 sandwiched between first sheet 60 and second sheet 64. Central vapor barrier sheet 62 is typically a thermosetting polyethylene sheeting that is permanently bonded to both first sheet 60 and second sheet 64. Thus, vapor barrier roll wrapping 58 is typically a paper-polyethylene-paper composite material. Other vapor barrier materials may be used as the central vapor barrier sheet 62. For example, paper impregnated with either wax or an asphaltic material would be suitable for use as vapor barrier sheet 62. In either of these cases the vapor barrier sheet 62 is permanently bonded between first sheet 60 and second sheet 64.

The embodiment of the tube shown in FIG. 2 is manufactured by first spirally winding inner layer 30 on a rotating mandrel. When a vapor barrier roll wrapping (58 in FIG. 5) is used, inner layer 30 and first vapor barrier layer 32 will be wrapped onto the mandrel at the same time since they are part of a single composite material. Moreover, since any number of strips of wrapping material may be used in any layer, use of more than one strip of vapor barrier roll wrapping 58 would result in multiple layers of vapor barrier material separated by first sheet 60 and second sheet 64 of the composite. Center layer 34, which comprises a plurality of strips of Kraft paper, is overwound over first vapor barrier layer 32. Since first vapor barrier layer 32 is preferably provided in the form of vapor barrier roll wrapping 58, the first strip of center layer 34 is applied directly over the second sheet 64 of vapor barrier roll wrapping 58. The number of strips in center layer 34 depends upon the total thickness desired for the tube. Second vapor barrier layer 36 is next overlaid over the last strip in center layer 34. As with the first vapor barrier layer 32, second vapor barrier 36 is preferably provided in the form of a vapor barrier roll wrapping 58. Thus, second vapor barrier layer 36 and outer layer 38 are applied in the same strip of material.

An adhesive is applied between each overlaid ply in a conventional manner. Thus, in the preferred embodiment, adhesive is applied between the second sheet 64 of vapor barrier roll wrapping 58 (which is used to supply the first vapor barrier 32) and the first strip of center layer 34, and also between each strip in center layer 34. The adhesive is also applied between the last strip of inner layer 34 and the first sheet 60 of the vapor barrier roll wrapping 58 that is used to supply the second vapor barrier layer 36.

The embodiment shown in FIG. 3 is manufactured in a similar manner, except that the first vapor barrier layer 42 and the second vapor barrier layer 46 are provided as separate strips of a vapor barrier material. These strips are preferably a polyethylene sheeting material, but could also be wax or asphalt impregnated paper. Two strips of Kraft paper, 50 and 52, are wound over one another to form inner layer 40. First vapor barrier layer 42 is next wound over inner layer 40. Center layer 44, which is depicted as consisting of multiple strips of Kraft paper is overlaid on first vapor barrier 42. Second vapor barrier layer 46, which is shown as one strip in FIG. 3, follows. Finally, outer layer 48, which consists of two strips of Kraft paper in FIG. 3, 54 and 56, is overlaid on second vapor barrier layer 46. A suitable adhesive is applied between each strip as it is wound on the core.

Since one edge of each strip of material that is wound on the mandrel during manufacture of the core either overlaps the opposite edge of the same strip (FIG. 1), or is offset from subsequent strips, a continuous vapor barrier is formed near the inner surface 12 and near the outer surface 14. The continuous vapor barrier layers prevent moisture from moving into center layer 34 of FIG. 2, and 44 of FIG. 3, through either inner surface 12 or outer surface 14. Thus, atmospheric moisture can migrate into the tube through the inner and outer surfaces only so far as the first and second vapor barrier layers. It is possible for atmospheric moisture to be absorbed through end walls 16 and 16'. End caps 15 and 15' (FIG. 1) reduce the amount of moisture absorption through the end walls when they are used. However, it has been found that the amount of moisture that can be absorbed into the core through end walls 16 and 16' is minimal, and does not cause changes in the overall length of the core. As a result, a tube manufactured in accordance with the present invention may be reused multiple times; inspection and measurement of the tubes is minimized.

Inner layer 30 and outer layer 38 (FIG. 2), and inner layer 40 and outer layer 48 (FIG. 3), form a protective layer for the adjacent vapor barrier layers 32 and 36, and 42 and 46, respectively. Thus, inner layer 30 and outer layer 38 of FIG. 2, and inner layer 40 and outer layer 48 act primarily to protect the underlying vapor barrier layers from mechanical damage that might result in a puncture in the continuous vapor barrier.

The tube is cut to the desired length after the tube is wound. If required, end caps 15 and 15', are attached to each end of the tube to facilitate attachment of the tube to the machinery used to wind paper on the tube or convert the paper. Finally, when the tubes of the present invention must be discarded the paper used in the tubes may be recycled.

Having described and illustrated the principles of my invention with reference to a preferred embodiment and a variation thereon, it is apparent that the invention can be modified in arrangement and detail without departing from its principles. Accordingly, I claim all modifications as may come within the scope and spirit of the following claims.

I claim:

1. A reusable, dimensionally stable, lightweight, multi-layer tubular core for supporting a roll of paper, the tubular core having laterally spaced apart opposite ends, comprising:

a multi-layer tubular member including an inner layer of cellulosic fiber sheet material, a first vapor barrier layer in overlying relation to the inner layer, a center layer of cellulosic fiber material in overlying relation to the first vapor barrier layer, a second vapor barrier layer in overlaying relation to the center layer, and an outer layer of cellulosic fiber material in overlying relation to the second vapor barrier layer adhesively, and each layer bonded to the adjacent layers, whereby the inner layer and outer layer protect the vapor barrier being substantially impervious to moisture to layers from damage, and the vapor barrier layers inhibit migration of moisture into the center layer and thereby inhibit dimensional changes in the core.

2. The tubular core of claim 1, wherein the inner, central, and outer layers comprise Kraft fiber.

3. The tubular core of claim 1, wherein the first and second vapor barrier layers comprise polyethylene sheet material.

4. The tubular core of claim 1, wherein the first and second vapor barrier layers comprise wax-impregnated cellulosic fiber material.

5. The tubular core of claim 1, wherein the first and second vapor barrier layers comprise cellulosic fiber material impregnated with an asphaltic material.

6. The tubular core of claim 1, wherein each layer includes a plurality of plies.

7. The tubular core of claim 1, wherein at least one of the layers includes a plurality of plies.

8. The tubular core of claim 1, wherein the ends of the tube are covered with end caps.

9. A spirally wound, reusable, dimensionally stable, lightweight, multiple layer tube for supporting a roll of paper, the tube having spaced apart opposite ends and a laminated wall, the wall comprising an inner layer of cellulosic fiber, a center layer of cellulosic fiber, an outer layer of cellulosic fiber, a first vapor barrier layer of polyethylene sandwiched between the inner and center layers, and a second vapor barrier layer of polyethylene sandwiched between the center and outer layers, said vapor barrier layers being substantially impervious to moisture to prevent absorption of atmospheric moisture by cellulosic fiber material in the center layer of the core and each layer being adhesively bonded to each adjacent layer.

10. The tube of claim 9, wherein each layer comprises a plurality of plies spirally wound over one another.

11. The tube of claim 9, wherein the inner, center, and outer layers are Kraft paper.

12. The tube of claim 9, wherein at least one of the layers comprises a plurality of plies spirally wound over one another.

* * * * *

UNITED STATES PATENT AND TRADEMARK OFFICE
CERTIFICATE OF CORRECTION

PATENT NO. : 5,167,994
DATED : December 1, 1992
INVENTOR(S) : Morris G. Paulson

It is certified that error appears in the above-identified patent and that said Letters Patent is hereby corrected as shown below:

Column 7, claim 1, line 33, the word "adhesively" should be deleted, and "adhesively" should be inserted after the second occurrence of "layer".

Column 7, claim 1, lines 35-36, "being substantially impervious to moisture to" should be deleted.

Column 7, claim 1, line 37, "being substantially impervious to moisture to" should be inserted after "layers".

Signed and Sealed this

Seventh Day of June, 1994

*Attest:*

BRUCE LEHMAN

*Attesting Officer*  *Commissioner of Patents and Trademarks*